(No Model.)
W. W. PEAY.
TRAP FOR WELLS.
No. 381,577. Patented Apr. 24, 1888.
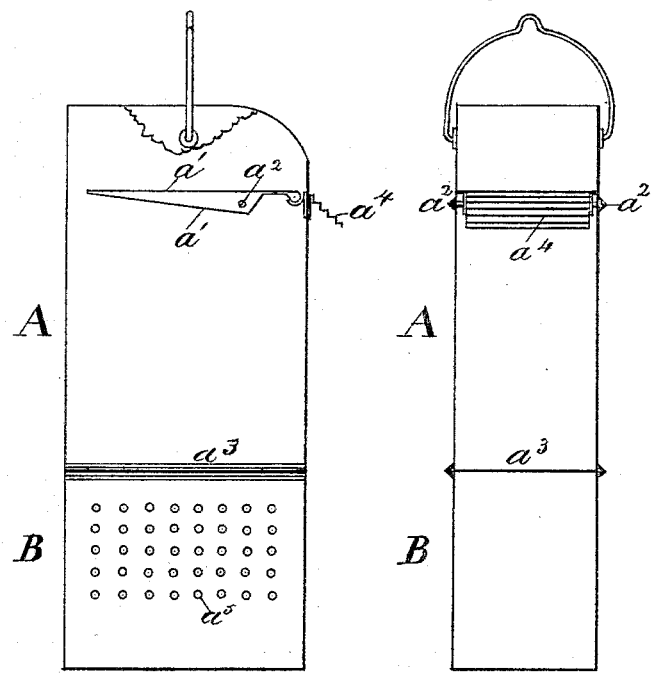
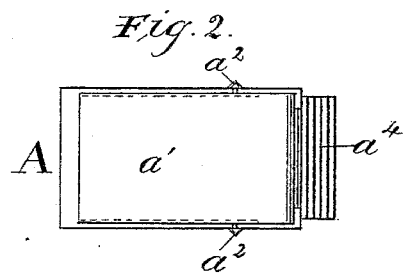
Witnesses
John Elliott.
G. Elliott.
Walter W. Peay.
Inventor.
per
William Gill
atty

UNITED STATES PATENT OFFICE.

WALTER W. PEAY, OF TORONTO, ONTARIO, CANADA.

TRAP FOR WELLS.

SPECIFICATION forming part of Letters Patent No. 381,577, dated April 24, 1888.

Application filed September 17, 1887. Serial No. 249,922. (No model.)

*To all whom it may concern:*

Be it known that I, WALTER W. PEAY, of the city of Toronto, in the county of York, in the Province of Ontario, Canada, have invented a new and useful Well-Cleaner; and I do hereby declare that the following is a full, clear, and exact description of the same.

My invention relates to a device which is intended to entrap and confine all such animals as frogs, toads, and rats, which are known to pollute wells, and to such an extent as to render the water altogether unfit for use.

The invention consists of two sheet-metal vessels so constructed that a projecting flange on each side of the bottom of the upper vessel slides in a corresponding groove formed in the inner top edge of the lower vessel, and by this means are disconnected when so required. The upper vessel is water tight and open at the top, in which a tilting horizontal platform is placed about three inches from the top edge of the vessel. The platform is journaled near to its front end and weighted until it is a little overbalanced, so that a frog going on the platform will, on moving forward, cause the inner end to drop down and tilt the said frog to the bottom of the vessel. The frogs, in swimming around near to the surface of the water, will take advantage of a resting-place, and will come in contact with the upper vessel and will get upon the platform, and from overbalancing the same will be tilted to the bottom of the vessel, as hereinbefore mentioned. The lower vessel is intended to sink the trap to the required depth to be used as a filter, the sides of the same being perforated, and is partially filled with charcoal, it being deemed necessary that means be used to purify the water from the effects of the animals that are from time to time being taken out from the water.

Reference being had to the accompanying drawings, Figure 1 is a side sectional elevation. Fig. 2 is a plan view of the device. Fig. 3 is an end elevation.

Similar letters of reference indicate similar or corresponding parts.

A represents the upper vessel; B, the lower vessel; $a'$, the tilting platform; $a^2$, the journals on which the platform swings; $a^3$, the bottom of the vessel; $a^4$, the only resting-place for the frog, and forms a stair on which it climbs to the platform, and from which it gets imprisoned in the cell of the upper vessel. Other animals than frogs will be caught and imprisoned in like manner.

The device is placed in working position as follows: The vessels, being connected in the manner described, are suspended in the well by means of a light chain or rope and chain attached to the bowl of the upper vessel, A, and to an indicator placed on the side of the pump or other suitable fixture, which will show when the vessel increases in weight and that it requires to be taken up and emptied. The water-line runs about or above the middle of the stair $a^4$, so that the frog has no difficulty in leaving the water.

I am aware of the patents of Hannah, No. 141,346, July 29, 1873; of Belknap, No. 169,886, November 16, 1875; of Kramer and Loeble, No. 179,205, June 27, 1876; of Turley, No. 271,952, February 6, 1883, and Gear, No. 338,399, March 23, 1886, in all of which patents the tilting platform is the chief feature. They are so constructed that none of them in their present form could be used in a well and answer the purpose of my well-cleaner.

Having thus described my invention and the manner in which the same is to be performed, I claim—

A well-cleaner consisting of two sheet-metal vessels, the upper one of which is water-tight and provided with a tilting platform and stairs leading thereto, and made to disconnect from the lower vessel when so required by flange and groove or other suitable means, the lower vessel being perforated in its widest sides and partially filled with charcoal to act as a filter, and which serves to sink the trap to the required depth, the whole constructed and arranged substantially as and for the purposes set forth.

WALTER W. PEAY.

Witnesses:
WILLIAM GILL,
ROBERT SMITH.